3,086,011
BASIC ESTERS OF 11-OXYGENATED 17,21-DI-HYDROXY-1,4-PREGNADIENE-3,20-DIONES
Robert L. Hull, Detroit, Mich., assignor to Parke, Davis & Company, Detroit, Mich., a corporation of Michigan
No Drawing. Filed Oct. 28, 1957, Ser. No. 692,539
1 Claim. (Cl. 260—239.5)

The present invention is concerned with anti-inflammatory compositions of high activity and increased water solubility. It is particularly concerned with basic esters of 11,17,21-trihydroxy-1,4-pregnadiene-3,20-dione and of 17,21-dihydroxy-1,4-pregnadiene-3,11,20-trione, with salts of these basic esters, and with processes for the manufacture of the foregoing compounds.

In the forms of their free bases, the compounds of this invention can be represented by the structural formula

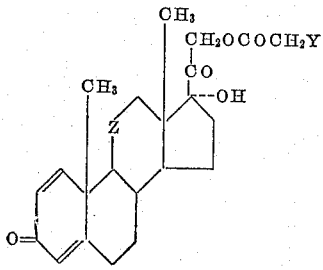

In this formula the term Z can represent a carbonyl (CO) group or a hydroxymethylene (CHOH) group. The term Y represents a substituted amino group. Thus, Y can represent a di-(lower)alkaylamino group of the formula

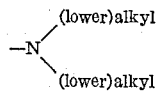

wherein the (lower)alkyl radicals are selected from among methyl, ethyl, propyl, butyl, amyl, hexyl, heptyl, octyl and branched-chain isomers thereof. Y can also represent a monocyclic, heterocyclic amino radical such as the morpholino group or a group of the formula

in which A represents a lower alkylene radical containing 4, 5, 6 or 7 carbon atoms, 4 or 5 of which are in annular position with the nitrogen atom. Thus, A can represent the tetramethylene group, in which case the foregoing formula designates the pyrrolidino radical, or A can represent the pentamethylene group, in which case the foregoing formula designates the piperidino radical. When A represent a branched-chain alkylene group, the foregoing formula represents a lower alkyl derivative of the pyrrolidino or piperidino radical.

Suitable starting materials for the manufacture of the compounds of this invention are 11β,17α,21-trihydroxy-1,4-pregnadiene-3,20-dione and 17α,21-dihydroxy-1,4-pregnadiene-3,11,20-trione. Upon treatment of one of these compounds with a haloacetic acid anhydride or a haloacetyl halide there occurs preferential esterification of the 21-hydroxyl group, with the formation of an 11β,17α-dihydroxy-21-haloacetoxy-1,4-pregnadiene-3,20-dione or a 17α-hydroxy-21-haloacetoxy-1,4-pregnadiene-3,11,20-trione. Reagents suitable for carrying out this esterification reaction include chloroacetic acid anhydride, bromoacetic acid anhydride, chloroacetyl chloride, and bromoacetyl bromide, as well as the corresponding iodo analogues and mixed halogen compounds such as chloroacetyl bromide.

The 21-haloacetoxy intermediate is then reacted with an amine such as a di-(lower)alkylamine, morpholine, pyrrolidine, an alkylpyrrolidine, piperidine, or an alkylpiperidine. This reaction, which results in the replacement of the halogen atom by an amino group, can be conducted by heating the haloacetoxy derivative with the selected amine, suitably by employing an excess of the latter reagent as a reaction solvent. It is preferred, however, to conduct the reaction in an unreactive solvent medium which is not an amine. The term "unreactive" is defined herein as designating a solvent which does not substantially interfere with the desired halogen replacement; it is not used to mean chemical inertness. For example, when the reaction solvent employed is an excess of the selected amine, this falls within the definition of an unreactive solvent because the portion which is in excess of that required for the condensation reaction is in fact unreactive. Other suitable unreactive solvents are hydrocarbons such as benzene, toluene and xylene; halogenated hydrocarbons such as methylene chloride, chloroform, carbon tetrachloride, ethylene dibromide, tetrachloroethylene and chlorobenzene; and ethers such as butyl ether and dioxane.

The replacement reaction is brought to substantial completion by heating the reactants in a solvent such as benzene or dioxane for up to 24 hours at about 60–100° C., although substantial conversion to the desired reaction product takes place at lower temperatures and with shorter reaction times. When equimolar quantities of the haloacetyl derivative and the amine are used, the product formed is the hydrohalide salt of the substituted amino ester. It can be isolated by concentration of the reaction mixture or by dilution of the mixture with a non-polar solvent. When the amine is used in a large excess, it reacts preferentially with the hydrogen halide formed in the condensation reaction, and the desired product is isolated as the free base by concentration of the reaction mixture, by dilution with a solvent in which the desired free base has very low solubility, or, where the reaction solvent is water-miscible, by pouring the mixture into water.

The free bases of this invention form non-toxic, water-soluble acid-addition salts with a number of inorganic and strong organic acids. Among such acids are hydrochloric, hydrobromic, hydriodic, sulfuric, acetic, benzoic, citric, maleic, malic, gluconic, ascorbic and related acids. Isolation of the salts as crystalline materials is facilitated by conducting the salt formation by admixture of the aminoacetoxy derivative and the selected acid in an anhydrous medium. The free bases, as they exhibit high solubility in acidified media, are equivalent to their non-toxic acid-addition salts for purposes of this invention.

In another method for the manufacture of compositions of this invention, cortisone or hydrocortisone is selectively acylated at position 21 with an agent such as chloroacetic acid anhydride, and the resulting chloroacetoxy derivative is converted to an aminoacetoxy derivative by reaction with an amine in the manner hereinbefore described. Fermentation of the resulting product with a dehydrogenating organism, such as a dehydrogenating strain selected from among Corynebacterium, Ophiobolus, Mycobacterium, Fusarium and Alternaria, affords the desired 1,4-diene. The dehydrogenation can also be effected with selenium dioxide, suitably in a solvent comprising tertiary butanol and acetic acid.

In another method for the manufacture of the compositions of this invention, 11β,17α,21-trihydroxy-1,4-pregnadiene-3,20-dione or 17α,21-dihydroxy-1,4-pregnadiene-3,11,20-trione is reacted with an acylating agent in which the amino group is already present. Examples of such acylating agents are dialkylaminoacetyl halides and analogous compounds.

The present invention affords compounds combining the advantages of high anti-inflammatory activity and high water solubility. These compounds are of particular value in applications where it is desired to administer a compound of adrenocorticoid activity in an aqueous medium. Such aqueous preparations are of particular suitability in ophthalmic and pharyngeal applications. The acid-addition salts of this invention exhibit the desired high solubility in water, whereas the free bases are correspondingly soluble in acidulated aqueous media.

This invention will appear more fully from the following examples, which are set forth by way of illustration only. Many modifications in materials and methods will be apparent from this disclosure to those skilled in the art.

*Example 1*

A mixture of 39.7 g. of 11β,17α,21-trihydroxy-1,4-pregnadiene-3,20-dione and 42.8 g. of chloroacetic acid anhydride in 200 ml. of anhydrous dioxane is heated under reflux for 4 hours. During this period the starting materials dissolve and a reaction product begins to crystallize from the solution. The cooled reaction mixture is then allowed to stand at room temperature for 16 hours, following which it is diluted with 200 ml. of dry ether and chilled for complete separation of product. The crystalline product is collected on a filter, washed with ether and with water, and dried. This compound is 11β,17α-dihydroxy-21-chloroacetoxy-1,4-pregnadiene-3,20-dione which melts with decomposition at about 260–263° C. and has a specific rotation of about +134° in ethanol solution. The structural formula is

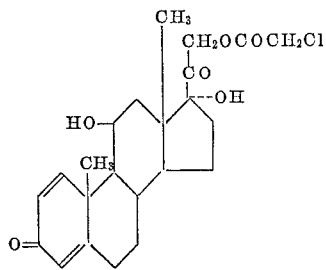

*Example 2*

To a solution prepared at 0° C. of 1.8 g. of anhydrous dimethylamine in 90 ml. of dry, purified dioxane is added 4.4 g. of 11β,17α-dihydroxy-21-chloroacetoxy-1,4-pregnadiene-3,20-dione The mixture is heated under reflux for 30 minutes, allowed to stand at room temperature for about 18 hours, and then poured with stirring into 500 ml. of ice water. The crude product which is precipitated as a free base is collected on a filter, washed with water and dried. It is then dissolved in 100 ml. of isopropyl alcohol which has been acidified with a slight excess of ethanolic hydrogen chloride. The solution is diluted to the point of cloudiness with ethyl acetate and chilled to induce crystallization. The 11β,17α-dihydroxy-21-dimethylaminoacetoxy-1,4-pregnadiene-3,20-dione hydrochloride which separates is collected on a filter and washed with ethyl acetate. After recrystallization from isopropyl alcohol this compound melts at about 245–247° C. and has a specific rotation of about +111° in ethanol solution. The structural formula of the free base is

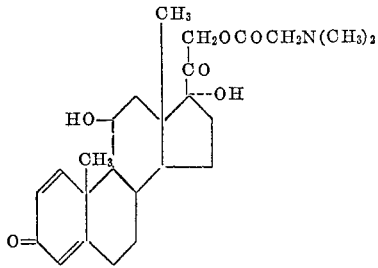

*Example 3*

A reaction mixture prepared from 39.7 g. of 11β,17α, 21-trihydroxy-1,4-pregnadiene-3,20-dione, 50.5 parts of bromoacetyl bromide and 250 ml. of dry dioxane is heated under reflux for 6 hours. A good separation of product is then achieved by concentrating the mixture by distillation of a portion of the dioxane, diluting with anhydrous ether, and chilling in an ice bath. The insoluble product, which is 11β,17α-dihydroxy-21-bromoacetoxy-1,4-pregnadiene-3,20-dione, is collected on a filter and washed with ether and with water. Without subjecting it to further purification, 4.8 g. of this compound is substituted for the 11β,17α - dihydroxy - 21 - chloroacetoxy-1,4-pregnadiene-3,20-dione in the procedure of Example 2 The compound isolated is 11β,17α-dihydroxy-21-dimethylaminoacetoxy-1,4-pregnadiene-3,20-dione, identical with the product of Example 2.

*Example 4*

A mixture of 2.2 g. of 11β,17α-dihydroxy-21-chloroacetoxy-1,4-pregnadiene-3,20-dione and 0.75 g. of diethylamine in 50 ml. of anhydrous benzene is heated under reflux for 16 hours. It is then diluted with 150 ml. of petroleum ether and filtered. The free base which is collected, 11β,17α-dihydroxy-21-diethylaminoacetoxy-1,4-pregnadiene-3,20-dione, is washed with petroleum ether and with several portions of water, and dried. The hydrochloride is obtained by dissolving this free base in 50 ml. of isopropyl alcohol which has been acidified with a slight excess of ethanolic hydrogen chloride, and inducing crystallization by diluting with ethyl acetate and chilling. The crystalline hydrochloride is collected on a filter and washed with ether. After recrystallization from a mixture of ethanol and ethyl acetate it melts at about 245–247° C. and exhibits a specific rotation of about +124.5° in methanol solution.

The hydrobromide is prepared by dissolving the free base in isopropyl alcohol, adding a slight excess of hydrogen bromide in ethanol, and diluting with ether to effect a good separation of the product.

The citrate is prepared by mixing warm solutions in isopropyl alcohol of 4.7 g. of the free base and 2.0 g. of citric acid.

*Example 5*

A reaction mixture prepared from 2.2 g. of 11β,17α-dihydroxy-21-chloroacetoxy-1,4, - pregnadiene-3,20-dione and 1.7 g. of piperidine in 20 ml. of anhydrous benzene is heated under reflux for 4 hours, following which it is diluted with petroleum ether, cooled and filtered. The solid free base is washed with petroleum ether and with water and dried. After recrystallization from a mixture of isopropyl alcohol and ether it melts with decomposition at about 242° C. This compound is 11β,17α-dihydroxy-21-piperidinoacetoxy-1,4-pregnadiene-3,20-dione.

The hydrochloride, prepared by the addition of a slight excess of hydrogen chloride to a solution of the free base in isopropyl alcohol, followed by dilution with ethyl acetate, melts at about 218–220° C. and has a specific rotation of about +118° in ethanol solution.

*Example 6*

By the procedure of Example 5, with the substitution of 2.3 g. of 2,6-dimethylpiperidine for the piperidine, the compound isolated as a free base is 11β,17α-dihydroxy - 21-(2,6-dimethylpiperidinoacetoxy)-1,4,-pregnadiene-3,20-dione. This compound exhibits an ultraviolet absorption maximum at about 242 millimicrons.

*Example 7*

A reaction mixture composed of 39.5 g. of 17α,21-dihydroxy-1,4-pregnadiene-3,11,20-trione, 42.8 g. of chloroacetic anhydride and 200 ml. of dry dioxane is heated under reflux for 6 hours, following which the mixture is concentrated by distillation, diluted with ether and chilled for complete separation of product. The 17α-hydroxy-21-chloroacetoxy-1,4-pregnadiene-3,11,20 - trione is collected, washed with ether and with water and dried.

To a refluxing mixture of 4.3 g. of this compound in 50 ml. of dry benzene is added in small portions 2.8 g. of pyrrolidine, and heating under reflux is continued for 6 hours. The product obtained by dilution of the mixture with petroleum ether and concentration is collected and washed with petroleum ether and with water. This compound is 17α-hydroxy-21-(pyrrolidinoacetoxy) - 1,4-pregnadiene-3,11,20-trione. An aqueous solution of the hydrochloride is obtained by dissolving this free base in water containing slightly more than the calculated amount of hydrochloric acid.

Example 8

By the procedure of Example 4, with the substitution of 2.2 g. of 17α-hydroxy - 21-chloroacetoxy-1,4,-pregnadiene-3,11,20-trione for the 11β,17α,-dihydroxy-21-chloroacetoxy-1,4-pregnadiene-3,20-dione, the free base obtained is 17α-hydroxy-21-diethylaminoacetoxy-1,4,pregnadiene-3,11,20-trione. Homologous dialkylaminoacetoxy derivatives are obtained by the substitution of equivalent quantities of other dialkylamines for the diethylamine. For example, there can be employed diisopropylamine, dihexylamine and dioctylamine.

Example 9

A reaction mixture prepared from 2.2 g. of 11β,17α-dihydroxy-21-chloroacetoxy-1,4-pregnadiene-3,20 - dione, 0.9 g. of morpholine and 50 ml. of purified, anhydrous benzene is heated under reflux for 16 hours, following which it is cooled and diluted with 150 ml. of purified petroleum ether. The insoluble product which separates is collected on a filter, washed with petroleum ether and with water, and dried. It is 11β,17α-dihydroxy-21-morpholinoacetoxy-1,4,pregnadiene-3,20-dione. For conversion to the hydrochloric acid salt, this entire product is dissolved in 50 ml. of isopropyl alcohol, and a slight excess of ethanolic hydrogen chloride is added. Crystallization is induced by diluting with ethyl acetate to the point of persistent turbidity, and chilling. The crystalline hydrochloride is collected on a filter and washed with ethyl acetate. This compound melts at about 166–168° C., and exhibits a specific rotation of about +101° in ethanol solution.

What is claimed is:

A compound of the structural formula

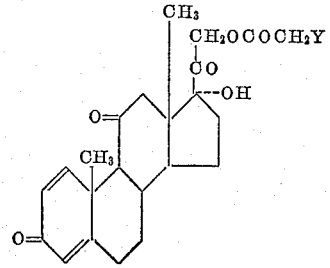

wherein Y is a member of the class consisting of morpholino, pyrrolidino, and piperidino.

References Cited in the file of this patent
UNITED STATES PATENTS

| | | |
|---|---|---|
| 2,708,651 | Laubach | May 17, 1955 |
| 2,816,902 | Gould | Dec. 17, 1957 |
| 3,005,836 | Pinson et al. | Oct. 24, 1961 |